US006195730B1

(12) United States Patent
West (10) Patent No.: US 6,195,730 B1
(45) Date of Patent: Feb. 27, 2001

(54) COMPUTER SYSTEM WITH STORAGE DEVICE MAPPING INPUT/OUTPUT PROCESSOR

(75) Inventor: Thomas D. West, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/122,008

(22) Filed: Jul. 24, 1998

(51) Int. Cl.[7] ........................................ G06F 12/14
(52) U.S. Cl. ............................ 711/121; 711/122; 710/52
(58) Field of Search ........................... 395/425, 325; 711/207, 100, 119, 202, 129, 3, 6, 113, 121, 122, 123, 124, 126, 205, 206; 707/8; 710/52

(56) References Cited

U.S. PATENT DOCUMENTS

| | | |
|---|---|---|
| 5,161,219 | 11/1992 | Nicholson et al. . |
| 5,247,648 | 9/1993 | Watkins et al. . |
| 5,263,142 | 11/1993 | Walkins et al. . |
| 5,287,482 | 2/1994 | Arimilli et al. . |
| 5,293,622 | 3/1994 | Nicholson et al. . |
| 5,418,927 | 5/1995 | Chang et al. . |
| 5,446,844 | 8/1995 | Steckler et al. . |
| 5,517,671 | 5/1996 | Parks et al. . |
| 5,778,429 | * 7/1998 | Sukegawa et al. .................. 711/129 |
| 5,802,547 | * 9/1998 | Legvold .............................. 711/100 |
| 5,875,462 | * 2/1999 | Bauman et al. ..................... 711/119 |
| 5,897,634 | * 4/1999 | Attaluri et al. ......................... 707/8 |
| 5,924,126 | * 7/1999 | Rosenthal et al. .................. 711/207 |
| 6,026,475 | * 2/2000 | Woodman ............................ 711/202 |

OTHER PUBLICATIONS

Writing $I_2O$ Device Drivers in IxWorks 1.0, Edition 1, Sep. 1997.

* cited by examiner

*Primary Examiner*—Thomas C. Lee
*Assistant Examiner*—Harold Kim
(74) *Attorney, Agent, or Firm*—Brooks & Kushman P.C.

(57) ABSTRACT

An input/output processor provides device virtualization "on-board" through the use of a dedicated IO cache memory. A computer system includes at least one host processor and associated main memory each with access to a system bus. Each input/output processor is also connected to the system bus through an expansion bus. IO adapters within the input/output processor each connect at least one storage device to the expansion bus. Also connected to the expansion bus is the cache memory and a control logic. The control logic receives a data transfer request from a requesting host processor. The data transfer request is mapped to a cache device object. The cache device object has associated data maintained in the cache memory. If any storage device is required for the data transfer, the data transfer request is mapped to the storage device capable of servicing the request. A location in cache memory is determined based on the mapped cache device object. The data transfer is performed based on the location and, if needed, the determined storage devices. This provides the host computer with a virtual view of the storage devices.

20 Claims, 5 Drawing Sheets

COMPUTER SYSTEM WITH STORAGE DEVICE MAPPING INPUT/OUTPUT PROCESSOR

TECHNICAL FIELD

The present invention relates to input/output processors permitting input/output device virtualization.

BACKGROUND ART

Computer systems span a variety of architectural designs. Many of these designs have several general features in common. One or more host processors, such as a microprocessor, are connected via a local bus to system memory. The system memory is used to provide the connected processors with program instructions and associated software program data. These programs include at least one operating system and a plurality of application programs.

To transfer data to and from an external storage device, such as a disk or tape drive, an input/output (IO) adapter is normally used. These IO adapters are physically connected to a system bus. The system bus provides a common standardized interface between IO adapters connected to the same bus. The system bus is connected to the local bus so that data can be transferred between the IO adapters and software programs executing upon the host processors. The system memory is used as a repository in the exchange of data. Once contained within system memory, the respective data can be processed by host processors under software program control.

Specific allocation of system memory for IO-related purposes requires that the operating system software makes suitable provisions including file system support, host device driver support, and IO adapter software and hardware support. Application programs must be able to take advantage of this software support.

The nature of this scheme imposes certain limitations upon IO operations. First, the capacity of system memory available specifically for IO operations at any given time is limited. Second, methods to allocate and otherwise use system memory for specifically IO-related purposes must be incorporated in the operating system. Third, the resulting associated performance degradation may limit the number and data rates of storage devices serviced.

One improvement is to incorporate one or more IO adapters into an IO processor (IOP). The IOP contains its own processor capable of executing instructions resulting in the transfer of data between a storage device and the system memory concurrently with application program instructions being executed by a host processor. The IOP may include local memory holding IOP processor instructions, IOP program data, data being transferred, and the like.

Using IOP local memory to hold data being transferred between storage devices and system memory incurs several constraints and disadvantages. First, data transfer operations into and out of the IOP local memory consume a notable amount of bandwidth of the IOP local bus connecting the IOP processor to local memory. Since the IOP processor must also use the IOP local bus for its memory operations, both the data transfer rate and the IOP processor execution rate are affected. Second, use of IOP local memory as a repository for data involved in an IO operation is subject to the same various resource allocation issues and constraints found when system memory is used. The IOP processor must balance the local memory resource between program execution needs and data transfer needs.

Another improvement is "device virtualization". Device virtualization is the facility to present the appearance of a particular type of peripheral storage device to an application program regardless of the actual storage device type. This frees the application program from the need to know any specific details about the storage device. For example, an application program may read from or write to storage as if the storage was composed of one large magnetic disk, when in fact, storage may be comprised of disk drives and tape drives of varying sizes, capabilities, and access logic.

Another example of device virtualization is a RAM disk. The operating system or associated software once again presents the image of a disk drive device. However, the repository for the data associated with the disk device image is maintained within the system memory. This permits faster access to data than would be possible if the data was actually maintained on a disk.

The two examples above illustrate device virtualization implemented "in-board" upon the computer system platform proper. Device virtualization may also be performed "out-board" by the storage device itself. For example, logic within the storage device may make the device appear as one large disk, when it is actually composed of many smaller disks. These physical disk devices may have characteristics such as form factor, capacity, interface protocol, and the like, that are quite dissimilar from the virtual disk device image presented to the computer system.

Both in-board and out-board device virtualization have undesirable properties. In-board device virtualization is performed by the operating system and, hence, requires host processor and system memory resources. Out-board device virtualization generally requires complex and expensive storage devices. Further, data transfer rates may be reduced due to the need to transfer control messages over the relatively slower cabling connecting storage devices with IO adapters.

What is needed is a system that provides device virtualization without requiring specialized storage devices or without utilizing host processor resources. The system should have widespread interoperability, providing a platform independent means of managing specifically IO-related cache memory. The system should be extensible, supporting a wide range of features including data compression, data encryption, global caching, data buffering, and the like.

DISCLOSURE OF INVENTION

It is an object of the present invention to provide device virtualization "on-board" the IOP.

Another object of the present invention is to provide an IOP with cache memory dedicated to data transfer.

Still another object of the present invention is to provide bus isolation between IO data transfers and host processor accesses to main memory.

Yet another object of the present invention is to provide an IOP compatible with a wide variety of host computer platforms and storage devices.

A further object of the present invention is to provide an IOP that permits on-board features such as data compression, data encryption, global caching, data buffering, and the like.

In carrying out the above objects and other objects and features of the present invention, an IOP is provided. At least one IOP operates in a computer system including at least one host processor and associated main memory, each with access to a system bus. Each IOP is also connected to the system bus. Each IOP includes an IOP expansion bus connected to the system bus. IO adapters each connect at least one storage device to the expansion bus. Also connected to the expansion bus is a cache memory and a control logic. The control logic receives a data transfer request from a requesting host processor. The data transfer request is mapped to a cache device object. The cache device object has associated data maintained in the cache memory. If any storage device is required for the data transfer, the data transfer request is mapped to the storage devices capable of servicing the request. A location in cache memory is determined based on the mapped cache device object. The data transfer is performed based on the location and, if needed, the determined storage devices. This provides the host computer with a virtual view of the storage devices.

In one embodiment, the control logic includes an IOP local bus connected to the expansion bus, an IOP microprocessor connected to the IOP local bus, and an IOP local memory connected to the IOP local bus. The IOP local memory contains instructions and data for implementing the control logic on the IOP microprocessor.

In another embodiment, the cache memory includes a collection of memory modules and an expansion bus interface connecting each memory module with the expansion bus. The expansion bus interface provides DMA controllers, each controller permitting concurrent access to the memory modules. In a refinement, a data processing module is connected between the expansion bus interface and each memory module. The data processing module selectively encrypts data written into each memory module and selectively decrypts data read from each memory module. In another refinement, the data processing module selectively compresses data written into each memory module and selectively expands data read from each memory module.

In yet another embodiment, a high speed IO adapter is connected to another high-speed IO adapter in at least one other IOP. The control logic transfers data between the cache memory and a corresponding cache memory in the other IOPs, thereby implementing a global cache memory.

In still another embodiment, the IOP is connected to a sending storage device and a receiving storage device. The control logic can read data in a first data format from the sending storage device at a first data rate, buffer the data in the cache memory, and write the buffered data in a second data format to the receiving storage device at a second data rate.

In a further embodiment, the cache memory is not mapped into the address space of any host processor.

A computer system for accessing at least one storage device is also provided. The computer system includes a system bus. At least one host processor is connected to the system bus. At least one main memory is also connected to the system bus, each main memory mapped into the address space of at least one host processor. A cache memory that is not mapped into the address space of any of the host processors is also included. At least one IOP is connected to the system bus, each IOP connecting at least one storage device to the computer system. Each IOP includes an IOP expansion bus connected to the system bus, at least one IO adapter, and a control logic. Each IO adapter connects at least one storage device to the expansion bus. Each IO adapter is in communication with the cache memory. The control logic is in communication with each IO adapter and the cache memory.

In one embodiment, at least a portion of the cache memory is divided into sections, each section connected to the expansion bus of one IOP.

In another embodiment, at least a portion of the cache memory is connected to the system bus.

An IOP is also provided that can present an image of at least one storage device to a computer system. The IOP includes an IOP expansion bus connected to the computer system bus. A cache memory and a control logic are also connected to the expansion bus. The control logic receives a data transfer request from a requesting host processor. The control logic maps the data transfer request to a cache device object having associated data maintained in the cache memory. The control logic determines a location in cache memory based on the mapped cache device object. Data transfer is then performed based on the determined location.

The above objects and other objects, features, and advantages of the present invention are readily apparent from the following detailed description of the best modes for carrying out the invention when taken in connection with the accompanying drawings.

BEST MODES FOR CARRYING OUT THE INVENTION

Figure 1:
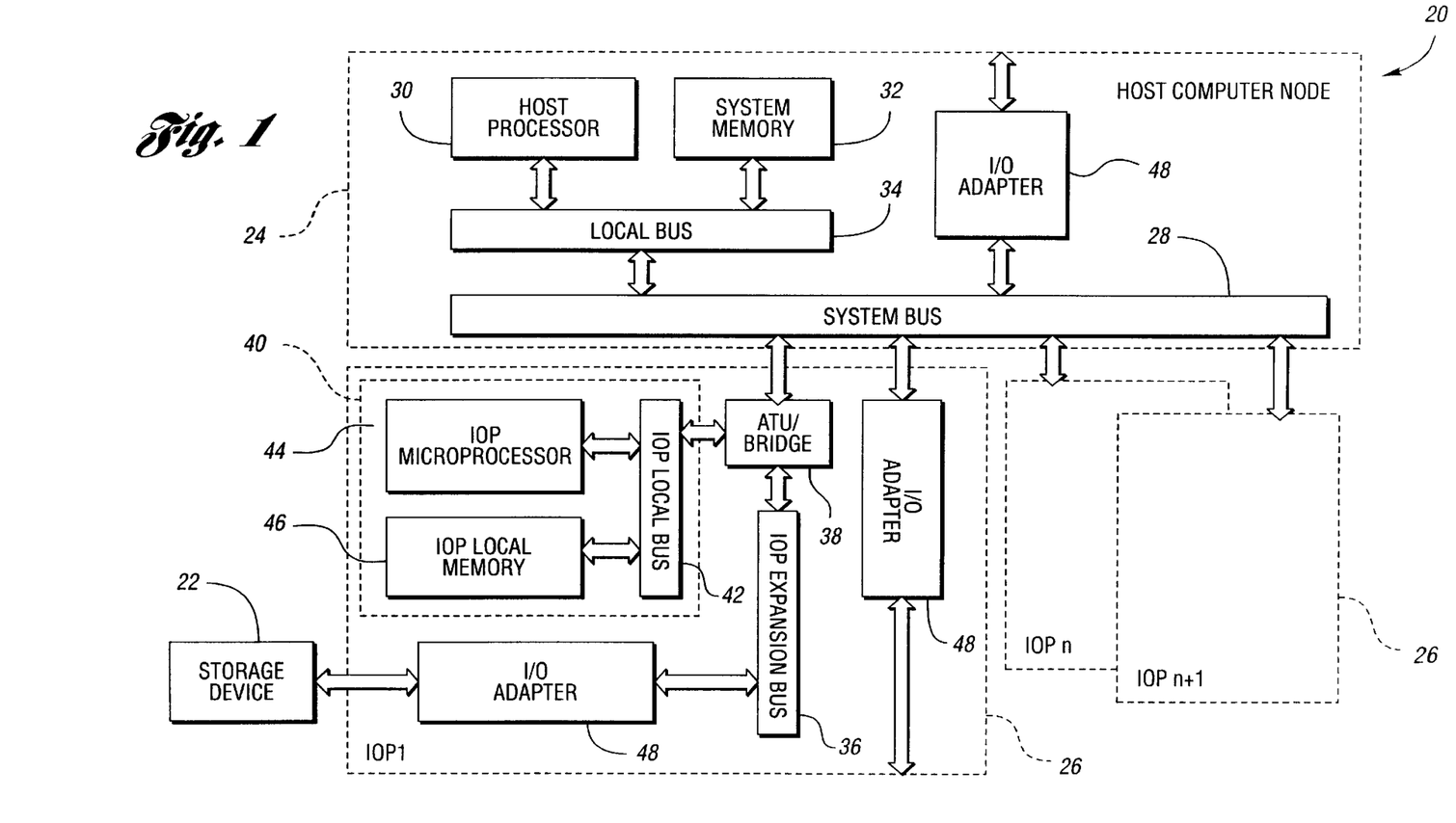
FIG. 1 is a block diagram of a prior computer system.

Referring now to FIG. 1, a block diagram of a prior computer system is shown. A computer system, shown generally by 20, can access one or more storage devices 22. Computer system 20 includes host computer node 24 and at least one input/output processor (IOP) 26. Host computer node 24 includes system bus 28, at least one host processor 30 connected to system bus 28, and system memory 32 connected to system bus 28. Often, local bus 34 allows host processor 30 to access system memory 32 without having to use system bus 28. In such architectures, local bus 34 provides access to system bus 28 for host processor 30 and system memory 32.

IOP 26 includes IOP expansion bus 36 connecting IOP 26 with system bus 28. IOP expansion bus 36 may include bridge 38. Bridge 38 includes driver electronics and may function as an address translation unit (ATU). IOP 26 also includes control logic 40 connected to expansion bus 36. Control logic 40 includes local bus 42 connected to expansion bus 36, IOP microprocessor 44 connected to local bus 42, and IOP local memory 46 connected to local bus 42. IOP local memory 46 contains instructions and program data for IOP microprocessor 44 as well as data buffered for IO transfers.

IOP 26 further includes IO adapter 48. IO adapter 48 connects at least one storage device 22 with system bus 28. IO adapter 48 may connect directly to system bus 28 or may connect to system bus 28 through expansion bus 36. IO adapter 48 may also be included in host computer node 24.

Computer system 20 may be an open system such as, for example, described in the "Intelligent I/O ($I_2O$) Architecture Specification" from the I₂O™ Special Interest Group of San Francisco, Calif. The specification includes a split driver model that essentially partitions both hardware an software into two distinct regions that communicate via a standardized transport/message layer. Host computer node 24 together with a particular operating system running on host processor 30 make up a first region. The second region includes one or more IOPs 26. Managed separately from host processor 30 within computer system 20, IOP 26 is solely dedicated to processing IO transactions.

Figure 2:
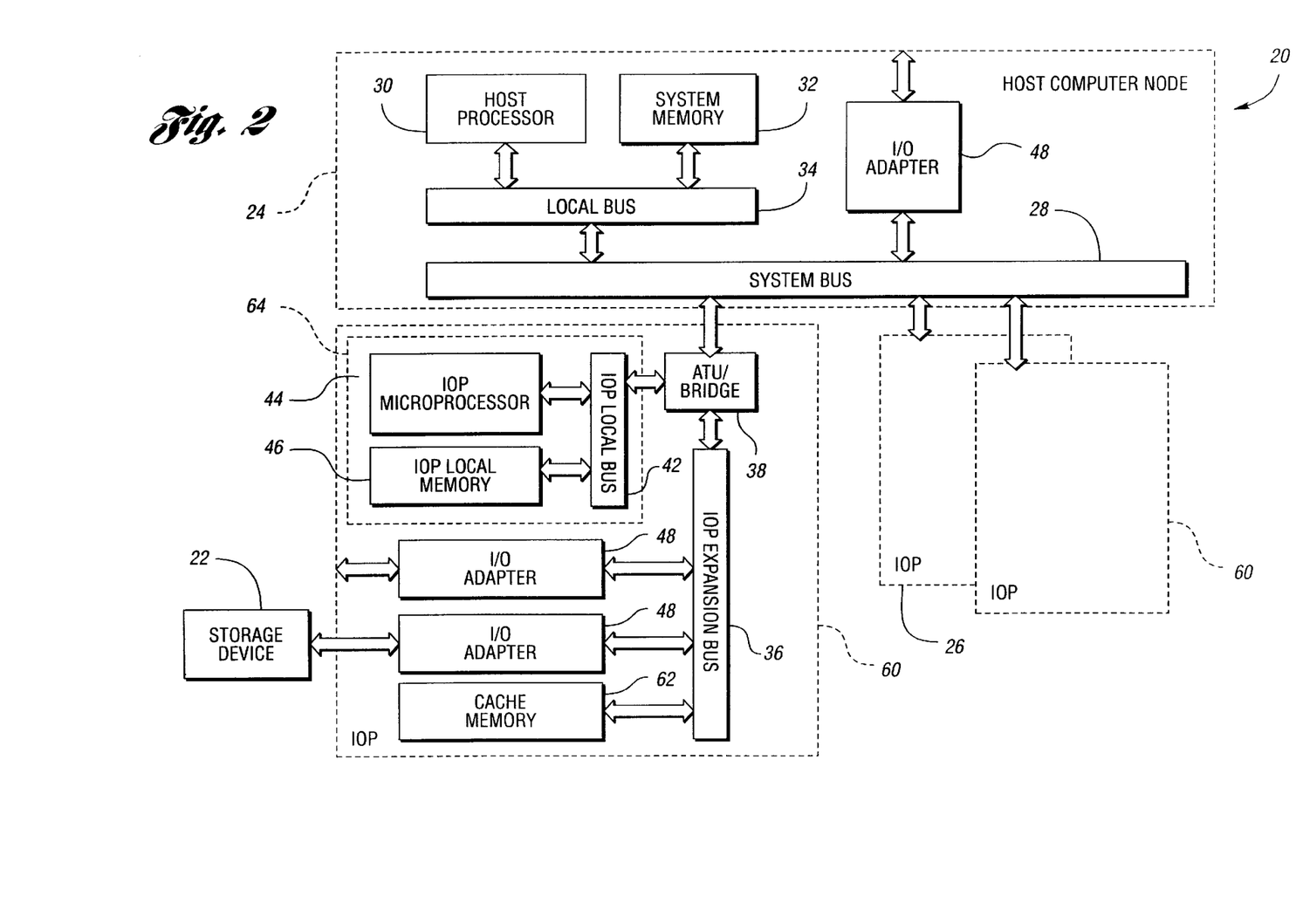
FIG. 2 is a block diagram of a computer system with an IOP according to the present invention.

Referring now to FIG. 2, a block diagram of a computer system with an IOP according to the present invention is shown. IOP 60 includes cache memory 62 connected to expansion bus 36 and control logic 64 connected to expansion bus 36.

Cache memory 62 is physically and functionally distinct from both system memory 32 and IOP local memory 46. Cache memory 62 is dedicated solely to serving IO requests, whereas both system memory 32 and IOP local memory 46 service host processor 30 and IOP microprocessor 44, respectively, for both program instructions and associated program data. Consequently, cache memory 62 affords a greater potential for performance improvements directly related to IO activity.

Control logic 64 includes IOP local bus 42 connected to IOP expansion bus 36, IOP microprocessor 44 connected to local bus 42, and IOP local memory 46 connected to local bus 42. Control logic 64 directs IOP 60 to perform the various features and embodiments described with regard to FIGS. 1–6.

Distinct from in-board and out-board examples of device virtualization, the present invention implements device virtualization on-board IOP 60. Through the use of cache memory 62, software executing upon IOP microprocessor 44 presents the appearance of a device image (or multiple device images) to host computer node 24 that may be completely different from the physical requirements of storage device 22 connected to IOP 60. Unlike prior inboard device virtualization schemes, the device virtualization afforded by IOP 60 does not make use of system memory 32 as a repository for the data associated with the virtual device image. Rather, cache memory 62 is used as the repository for data transfer. Moreover, when implemented within the context of an open system architecture, IOP 60 and associated software provide platform independent device virtualization that is not constrained to a particular operating system. For example, if computer system 20 is I₂O™ compliant, programs executing upon host computer node 24 access virtual devices within IOP 60 by means of standardized messages. The virtual disk or virtual tape device images presented by IOP 60 are applicable to any I₂O™ compliant operating system.

In general, IOP 60 yields the ability to implement and exercise various advantages of device virtualization more economically, more readily, and in some cases, more efficiently and effectively than can be achieved when performed out-board by a peripheral storage system. For example, when device mirroring is provided by storage device 22, host computer node 24 incurs the interface protocol overhead and additional data transfer time between storage device 22 and host computer node 24. Since IOP 60 is directly connected to system bus 28, the mirrored devices presented by IOP 60 do not incur the interface protocol and data transfer overhead associated with storage device 22.

In a preferred embodiment of the present invention, IOP 60 can be used as a data buffer. IOP 60 is connected to sending storage device 22 and receiving storage device 22 through one or more IO adapters 48. Control logic 64 reads data in a first data format from sending storage device 22 at a first data rate, buffers the read data in cache memory 62, and writes the buffered data in a second data format to receiving storage device 22 at a second data rate. Sending storage device 22 and receiving storage device 22 may be the same or different storage device 22. Also, first data rate and second data rate may be the same or different. Further, the first data format may be the same or different as the second data format. An example of data buffering is the transfer of data from a disk device to a tape device as part of a data back-up procedure.

A distinct advantage arises from using cache memory 62. Consider sending storage device 22 connected to a first IO adapter 48 and receiving storage device 22 connected to a second IO adapter 48 since first IO adapter 48, second IO adapter 48, and cache memory 62 are all connected to expansion bus 36, only the bus bandwidth of IOP expansion bus 36 is consumed during the data transfer. Neither IOP local bus 42 nor system bus 28 are involved in the data transfer.

In an embodiment of the present invention, IOP 60 presents one or more storage device virtualizations without a corresponding physical storage device 22. This may be used, for example, to implement a purely virtual RAM disk. As such, IOP 60 may connect to no storage device 22 and, hence, will contain no IO adapter 48.

Computer system 20 may include more than one IOP 60, and may include a mixture of IOP 60 and traditional IOP 26.

In a preferred embodiment, cache memory 62 is not mapped into the address space of any host processor 30. Host processor 30 accesses cache memory 62 indirectly using messages passed to IOP microprocessor 44. In an alternative embodiment, host processor 30 can access cache memory 62 directly.

Figure 3:
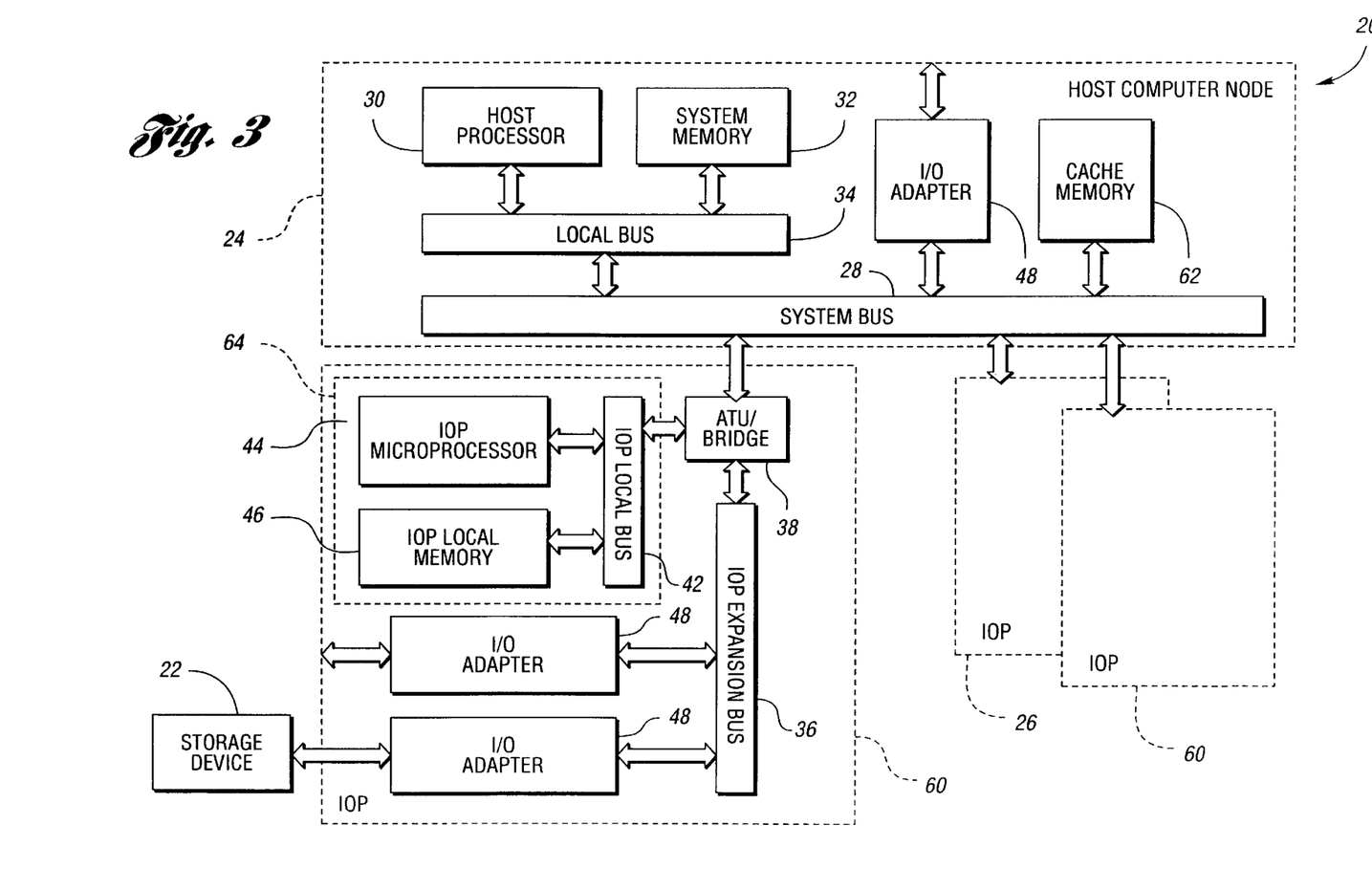
FIG. 3 is a block diagram of an alternative embodiment of the present invention having the cache memory connected to the system bus.

Referring now to FIG. 3, a block diagram of an alternative embodiment of the present invention having the cache memory connected to the system bus is shown. Instead of having cache memory 62 divided into sections, with each section connected to expansion bus 36 of one IOP 60, the entire cache memory for computer system 20 may be connected to system bus 28. This allows greater flexibility for allocating cache memory 62 amongst IOPs 60. Another advantage occurs when many of the data transfer operations are between system memory 32 and cache memory 62. Since both system memory 32 and cache memory 62 are connected to system bus 28, better overall bus bandwidth utilization is achieved.

It is possible within the spirit and scope of the present invention to have cache memory 62 both in IOPs 60 and host computer node 24.

Figure 4:
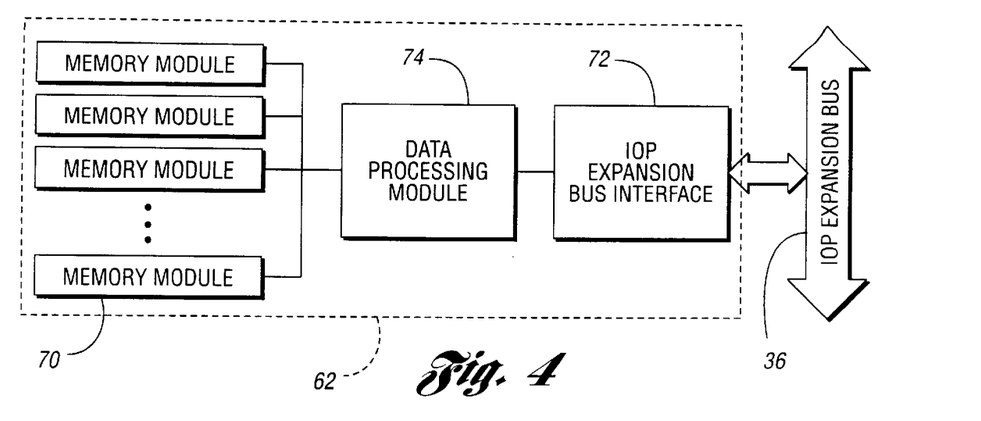
FIG. 4 is a block diagram of an embodiment of a cache memory according to the present invention.

Referring now to FIG. 4, a block diagram of an embodiment of a cache memory according to the present invention is shown. Cache memory 62 includes a plurality of memory modules, one of which is indicated by 70, connected to expansion bus 36 by IOP expansion bus interface 72. Memory module 70 could consist of currently available high performance SDRAM. For enhanced data integrity, memory module 70 may feature error correcting code circuitry.

Expansion bus interface 72 provides multiple independent programmable DMA controllers which feature concurrent operation along with bus-mastering capabilities. Such DMA controllers allow software executing upon IOP microprocessor 44 to program each separate DMA controller. Programming an individual DMA controller would consist of specifying, for example, the source and destination address of the data transfer, the amount of data to transfer, the direction of transfer operation, and the like. IOP processor 44 can subsequently instruct the particular DMA controller to initiate the corresponding data transfer operation. The DMA controller in turn will automatically perform the specified data transfer operation and, optionally, interrupt IOP microprocessor 44 at the conclusion of data transfer or in the event of a data transfer error. The multiple DMA controllers within expansion bus interface 72 must support concurrent operation. This will allow multiple concurrent DMA data transfer operations to occur. The PLX 9080 PCI BUS MASTER INTERFACE CHIP from Plx Technology, Inc. provides an example of the type of circuitry required to implement IOP expansion bus 72. The construction of cache memory 62 frees resources in control logic 64, such as local bus 42 and local memory 46, from being directly involved with data transfer.

In embodiments of the present invention, data processing module 74 is connected between expansion bus interface 72 and memory modules 70. In one embodiment, data processing module 74 selectively encrypts data written into memory module 70 and selectively decrypts data read from memory module 70 under the control of control logic 64. In another embodiment, data processing module 74 selectively compresses data written into memory module 70 and selectively expands data read from memory module 70 under the control of control logic 64.

Figure 5:
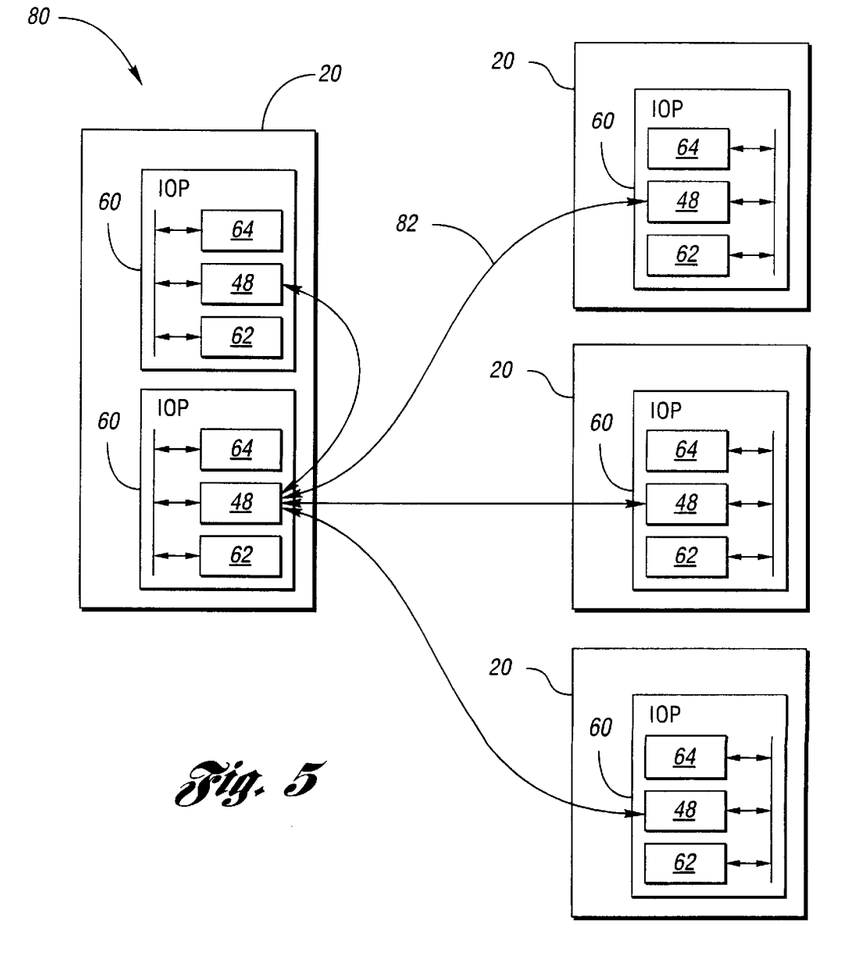
FIG. 5 is a block diagram illustrating connections between IOPs for implementing a global cache according to the present invention.

Referring now to FIG. 5, a block diagram illustrating connections between IOPs for implementing a global cache according to the present invention is shown. A global memory, shown generally by 80, is distributed amongst several IOPs 60. These IOPs 60 may be in a single computer system 20, may be distributed amongst many computer systems 20, or both. Each IOP 60 participating in global cache 80 includes at least one high speed IO adapter 48. Each high speed adapter 48 is connected to at least one other high speed adapter 48 through interconnection 82. Although a star interconnect topology is shown in FIG. 5, any other suitable topology such as bus, ring, complete interconnect, or the like, may be used. Control logic 64 in IOP 60 transfers data between cache memories 62 on different IOPs 60, thereby implementing global cache memory 80.

High speed adapter 48 acts as a data transfer pipe for transferring data between cache memories 62. The particular bus protocol used may be a common standardized interface such as fiber channel, SCSI, and the like. One device suitable for functioning as high speed adapter 48 is the ISP2100 INTELLIGENT FIBER CHANNEL PROCESSOR chip currently available from Qlogic Corporation.

Figure 6:
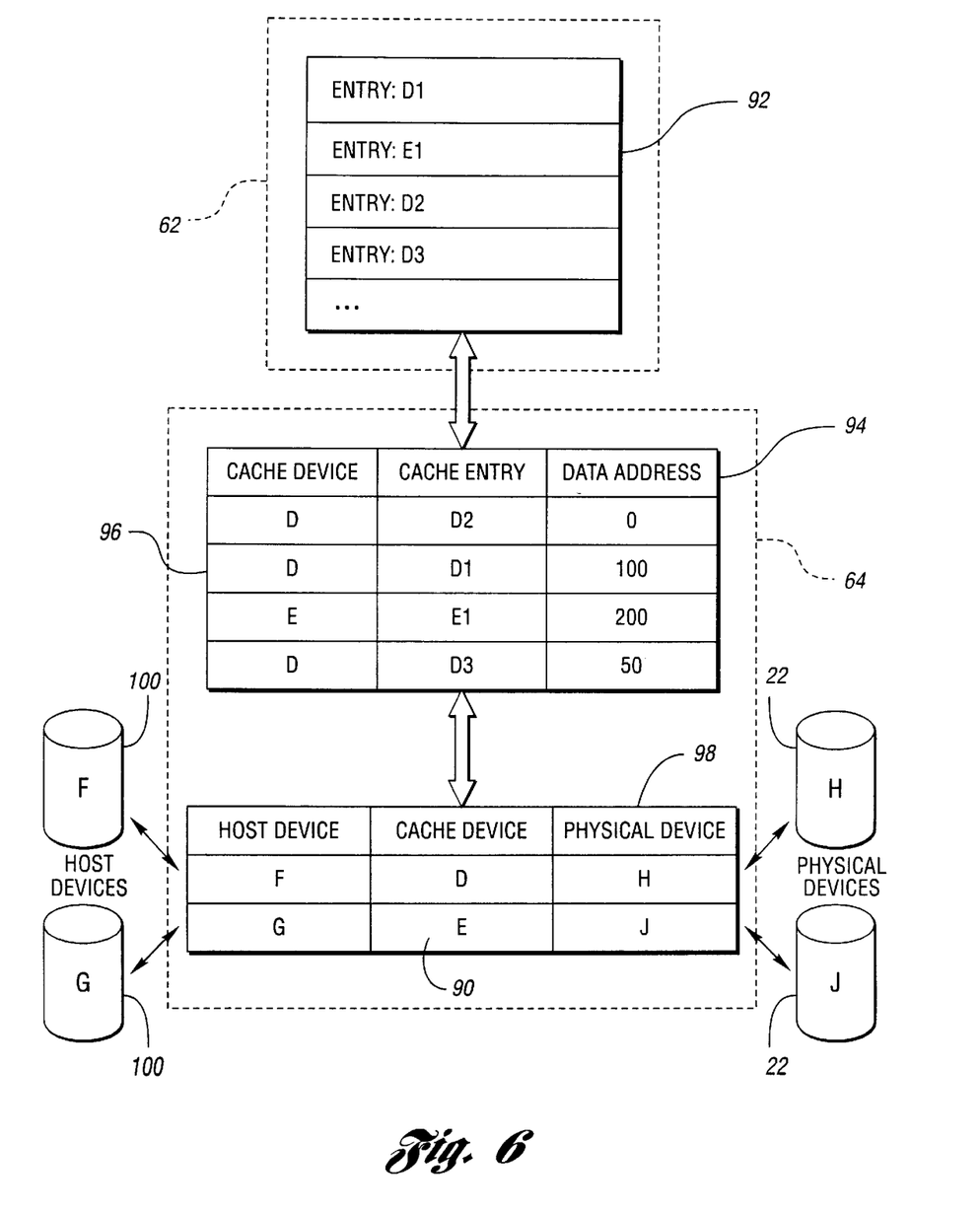
FIG. 6 is a block diagram describing device virtualization according to the present invention.

Referring now to FIG. 6, a block diagram describing device virtualization according to the present invention is shown. Device virtualization centers around the notion of a cache device abstraction. A cache device represents a discrete object whose associated data is maintained within cache memory 62. One or more cache devices can be affiliated with each cache memory 62. A cache device is fundamentally an abstraction with which to associate data. That is, a cache device represents a collection of data that is addressed in a linear fashion. Hence, a cache device consists of some specific quantity of data x, with first byte of data identified with an address of zero and the last byte of data identified with an address of x–1. There is no other geometry associated with the cache device. More specifically, a cache device does not have an attribute which typifies it as a tape device, a disk device, or the like.

A cache device object, one of which is shown by 90, includes data maintained within cache memory 62 by means of a collection of discrete cache entries, one of which is indicated by 92. Each cache entry 92 represents some subset of data associated with representative cache device 90. Hence, for example, cache device D could consist of cache entries D1, D2, and D3. Cache entries 92 can be either fixed or variable in length. The format of each cache entry 92 consists of three major elements. The first element is a header including various fields that represent metadata about respective cache entry 92. These fields identify the associated cache device 90, the amount of cache device 90 data contained within cache entry 92, the state of associated cache device 90 data, and the like. The state of associated cache device 90 data includes whether or not cache device 90 data is currently valid, compressed, encrypted, and the like. The second element in cache entry 92 is the actual data associated with respective cache device 90. The third element is a trailer containing additional metadata about respective cache entry 92. It can include, for example, a check sum value that covers the overall cache entry 92.

Cache entries 92 are collectively managed by control logic 64 using cache directory 94. Only a portion of cache directory 94 is shown in FIG. 6. For example, cache directory 94 might also have an associated cache hash table. Cache directory 94 includes a collection of cache directory entries, one of which is indicated by 96. Each cache directory entry 96 maps cache entry 92 for respective cache device 90 with a physical data address in cache memory 62. This address indicates the starting location for cache entry 92. Cache directory entry 96 may also include additional information such as the length of data contained within associated cache entry 92, the current state of associated cache entry 92, and the like. Note that, due to the metadata surrounding each individual cache entry 92 contained within cache memory 62, cache directory 94 can be reconstructed from the contents of cache entries 92 in the event of some failure with cache directory 94. Hence, the cache entries 92 exhibit the potential for "self-defining" data.

Mapping table 98 correlates cache device 90 to either host device image 100, physical devices within storage device 22, or both. Host device image 100 is the virtual device image presented by IOP 60 to host computer node 24. One or more host device 100 can be associated with cache device 90 by mapping table 98. If data represented by cache device 90 is to be maintained upon some physical media, then mapping table 98 also includes an indication that a particular device 90 is associated with a particular physical device in storage device 22.

Mapping table 98, in conjunction with cache device 90, provides several important artifacts. First, one or more host device image 100 can be associated with the same cache device 90. This allows, for example, various data mirroring and nearly instantaneous data copying capabilities as seen from the perspective of host computer node 24. Second, host device images 100 representing different and possibly dissimilar device types can be presented to host computer node 24. These "virtual" host device images 100 could be associated via mapping table 98 with one or more possibly different cache devices 90. IOP 60 essentially superimposes a particular host device image 100 over the data associated with the respective cache device 90. Third, mapping table 98 allows for the association of dissimilar host 100 and physical device 22 types through the abstract cache device 90 intermediary. Hence, for example, host device image 100 could be a disk as the virtual device image presented to host computer node 24 whereas the associated physical device 22 could actually be a tape device. Fourth, given volatile cache memory 62 together with mapping table 98 that indicates the absence of a corresponding physical device 22, the respective cache device 90 and associated host devices 100 would be totally volatile in nature. Thus, if no storage device 22 was associated with cache device 90 in mapping table 98, the data presented by host device image 100 would be entirely volatile. Fifth, mapping table 98 could also be extended to allow for cache device 90 to be associated with more than one storage device 22. This could support, for example, physical device mirroring capabilities.

The contents of mapping table 98 would normally be established by IOP 60 as part of the configuration process for IOP 60. Normally, the contents of mapping table 98 would remain fairly static and be preserved across initialization of control logic 64. IOP 60 could, however, permit some dynamic changes to mapping table 98. This would allow for such things as system failure of host computer node 24, on-line capacity changes in host device image 100, modifications to storage device 22, or the like.

During operation, control logic 64 would receive a data transfer request from requesting host processor 30 within host computer node 24. The data transfer request would be directed toward a particular host device image 100. Control logic 64 maps the data transfer request to cache device object 90. If storage device 22 is required for the data transfer as may be the case if, for example, the requested data is not currently contained within cache memory 62, control logic 64 maps the data transfer request to one or more storage device 22 capable of servicing the request. Control logic 64 determines a location in cache memory 62 based on the mapped cache device object 90 to be used for the data transfer. Data transfer is then performed based on the location in cache memory 62 and, if required, storage device 22.

While the best modes for carrying out the invention have been described in detail, those familiar with the art to which this invention relates will recognize various alternative designs and embodiments for practicing the invention as defined by the following claims.

What is claimed is:

1. In a computer system comprising at least one host processor and associated main memory, each with access to a system bus, at least one input/output processor (IOP) connected to the system bus, each IOP operable to connect at least one storage device to the computer system, each IOP comprising:
   an IOP expansion bus connected to the system bus;
   at least one input/output (IO) adapter, each IO adapter connecting at least one of the at least one storage device to the expansion bus;
   a data cache memory connected to the expansion bus; and
   a control logic connected to the expansion bus, the control logic in communication with each of the at least one IO adapter and the data cache memory, the control logic operative to
   (a) receive a data transfer request from a requesting host processor,
   (b) map the data transfer request to a cache device object, the cache device object having associated data maintained in the data cache memory,
   (c) determine if any of the at least one storage device is required for the data transfer and, if any storage device is required, map the data transfer request to the at least one storage device capable of servicing the request,
   (d) determine a location in data cache memory based on the mapped cache device object, and
   (e) perform the data transfer based on the determined location and the at least one mapped storage device if a storage device is determined to be required;
   thereby providing the host computer with a virtual view of the at least one storage device.

2. An IOP as in claim 1 wherein the control logic comprises:
   an IOP local bus connected to the expansion bus;
   an IOP microprocessor connected to the IOP local bus; and
   an IOP local memory connected to the IOP local bus, the IOP local memory containing instructions and data for implementing the control logic on the IOP microprocessor.

3. An IOP as in claim 1 wherein the data cache memory comprises:
   a plurality of memory modules; and
   an expansion bus interface connecting each memory module, with the expansion bus, the expansion bus interface operable to provide a plurality of DMA controllers, each DMA controller operable to permit concurrent access to the plurality of memory modules.

4. An IOP as in claim 3 further comprising a data processing module connected between the expansion bus interface and each memory module, the data processing module in communication with the control logic, the data processing module operative to selectively encrypt data written into each memory module and selectively decrypt data read from each memory module.

5. An IOP as in claim 3 further comprising a data processing module connected between the expansion bus interface and each memory module, the data processing module in communication with the control logic, the data processing module operative to selectively compress data written into each memory module and to selectively expand data read from each memory module.

6. An IOP as in claim 1 further comprising a high-speed IO adapter connected to another high-speed IO adapter in at least one other IOP, the control logic further operable to transfer data between the data cache memory and a corresponding data cache memory in the at least one other IOP, thereby implementing a global data cache memory.

7. An IOP as in claim 1 wherein the IOP is connected to a sending storage device and a receiving storage device, the control logic further operable to
   read data in a first data format from the sending storage device at a first data rate;
   buffer the read data in the data cache memory; and
   write the buffered data in a second data format to the receiving storage device at a second data rate.

8. An IOP as in claim 1 wherein the data cache memory is not mapped into the address space of any host processor.

9. A computer system for accessing at least one storage device, the computer system comprising:
   a system bus;
   at least one host processor connected to the system bus;
   at least one main memory connected to the system bus, each of the at least one main memory mapped into the address space of at least one host process or;
   a data cache memory not mapped into the address space of any of the at least one host processor; and
   at least one input/output processor (IOP) connected to the system bus, each IOP operable to connect at least one storage device to the computer system, each IOP comprising an IOP expansion bus connected to the system bus, at least one input/output adapter, each IO adapter connecting at least one storage device to the expansion bus, each IO adapter in communication with the data cache memory, and a control logic connected to the expansion bus, the control logic in communication with each of the at least one IO adapter and the data cache memory.

10. A computer system as in claim 9 wherein at least a portion of the data cache memory is divided into sections, each section connected to the expansion bus of one IOP.

11. A computer system as in claim 9 wherein at least a portion of the data cache memory is connected to the system bus.

12. A computer system as in claim 9 wherein the control logic is operative to (a) receive a data transfer request from a requesting host processor, (b) map the data transfer request to a cache device object, the cache device object having associated data maintained in the data cache memory, (c) determine if a storage device is required for the data transfer and, if a storage device is required, map the data transfer request to the at least one required storage device capable of servicing the request, (d) determine a location in data cache memory based on the mapped cache device object, and (e) perform the data transfer based on the determined location and the at least one mapped storage device if a storage device is determined to be required.

13. A computer system as in claim 9 wherein the control logic comprises:

an IOP local bus connected to the bus;

an IOP microprocessor connected to the IOP local bus; and an IOP local memory connected to the IOP local bus, the IOP local memory containing instructions and data for implementing the control logic on the IOP microprocessor.

14. A computer system as in claim 9 wherein the data cache memory is connected to a bus from a set including the system bus and the expansion bus of one IOP, the data cache memory comprises:

a plurality of memory modules; and a bus interface connecting each memory module with the bus, the bus interface operable to provide a plurality of DMA controllers, each DMA controller operable to permit concurrent access to the plurality of memory modules.

15. An IOP as in claim 14 further comprising a data processing module connected between the bus interface and each memory module, the data processing module in communication with the control logic, the data processing module operative to selectively encrypt data written into each memory module and selectively decrypt data read from each memory module.

16. An IOP as in claim 14 further comprising a data processing module connected between the bus interface and each memory module, the data processing module in communication with the control logic, the data processing module operative to selectively compress data written into each memory module and to selectively expand data read from each memory module.

17. An IOP as in claim 9 further comprising a high-speed IO adapter connected to another high-speed IO adapter in at least one other IOP, the control logic further operable to transfer data between the data cache memory and a corresponding data cache memory in the at least one other IOP, thereby implementing a global data cache memory.

18. An IOP as in claim 9 wherein the IOP is connected to a sending storage device and a receiving storage device, the control logic further operable to read data in a first data format from the sending storage device at a first data rate;

buffer the read data in the cache memory; and write the buffered data in a second data format to the receiving storage device at a second data rate.

19. In a computer system comprising at least, one host processor and associated main memory, each with access to a system bus, at least one input/output processor (IOP) connected to the system bus, each IOP operable to present an image of at least one storage device to the computer system, each IOP comprising:

an IOP expansion bus connected to the system bus;

a data cache memory connected to the expansion bus; and a control logic connected to the expansion bus, the control logic in communication with the data cache memory, the control logic operative to (a) receive a data transfer request from a requesting host processor, (b) map the data transfer request to a cache device object, the cache device object having associated data maintained in the data cache memory, (c) determine a location in data cache memory based on the mapped cache device object, and (d) perform the data transfer based on the determined location;

thereby providing the host computer with a virtual image of the at least one storage device.

20. An IOP as in claim 19 wherein the data cache memory is not mapped into the address space of any host processor.

* * * * *